(12) United States Patent
Haas et al.

(10) Patent No.: US 11,940,316 B2
(45) Date of Patent: Mar. 26, 2024

(54) OPTICAL OPERATING FLUID DETECTOR FOR THE OPTICAL DETECTION OF OPERATING FLUID FOR A HAND-GUIDED GARDEN, FORESTRY AND/OR CONSTRUCTION MACHINING APPLIANCE, AND HAND-GUIDED GARDEN, FORESTRY AND/OR CONSTRUCTION MACHINING APPLIANCE

(71) Applicant: Andreas Stihl AG & Co. KG, Waiblingen (DE)

(72) Inventors: Alexander Haas, Spraitbach (DE); Michael Pulfer, Wilen bei Wil (CH)

(73) Assignee: Andreas Stihl AG & Co. KG, Waiblingen (DE)

( * ) Notice: Subject to any disclaimer, the term of this patent is extended or adjusted under 35 U.S.C. 154(b) by 262 days.

(21) Appl. No.: 17/122,459

(22) Filed: Dec. 15, 2020

(65) Prior Publication Data
US 2021/0181007 A1 Jun. 17, 2021

(30) Foreign Application Priority Data
Dec. 16, 2019 (EP) .................................... 19216523

(51) Int. Cl.
*G01F 23/292* (2006.01)
*B27B 17/12* (2006.01)

(52) U.S. Cl.
CPC .......... *G01F 23/2927* (2013.01); *B27B 17/12* (2013.01)

(58) Field of Classification Search
CPC ............................ G01F 23/2927; B27B 17/12
See application file for complete search history.

(56) References Cited

U.S. PATENT DOCUMENTS

| 4,797,655 A | 1/1989 | Orndal et al. |
| 4,857,050 A * | 8/1989 | Lentz .................... A61M 5/365 604/122 |

(Continued)

FOREIGN PATENT DOCUMENTS

| CN | 202805328 U | 3/2013 |
| CN | 107548636 A | 1/2018 |

(Continued)

*Primary Examiner* — Thanh Luu
(74) *Attorney, Agent, or Firm* — Crowell & Moring LLP

(57) ABSTRACT

An optical operating fluid detector for optical detection of operating fluid for a hand-guided garden, forestry and/or construction machining appliance includes a light source, an operating fluid line and a light receiver. The light source is designed for radiation of rays of light. The operating fluid line is designed for optical interaction of rays of light from the light source with operating fluid in line for the optical detection of operating fluid. The light receiver is designed for differing reception of rays of light from the line in dependence on the presence or the absence of operating fluid in the line. The operating fluid detector has an optical deflecting device. The deflecting device is designed for deflection of rays of light from the light source to the operating fluid line and/or for deflection of rays of light from the line to the light receiver. The operating fluid line is designed for differing diversion of rays of light from the light source in dependence on the presence or the absence of operating fluid in the line for optical detection of operating fluid.

18 Claims, 6 Drawing Sheets

(56) References Cited

U.S. PATENT DOCUMENTS

| | | | |
|---|---|---|---|
| 10,502,654 B1* | 12/2019 | Schroeder | G01M 3/40 |
| 10,730,736 B1* | 8/2020 | Candler | B67D 1/0888 |
| 2013/0291831 A1* | 11/2013 | Schinkel | F02D 31/001 |
| | | | 123/395 |
| 2014/0226149 A1* | 8/2014 | Coates | G01N 21/35 |
| | | | 356/51 |
| 2016/0178425 A1* | 6/2016 | Bernhard | G01F 23/2924 |
| | | | 250/577 |
| 2018/0031407 A1* | 2/2018 | Kopansky | G01F 23/2922 |
| 2018/0320568 A1* | 11/2018 | Aronsson | F01M 11/02 |
| 2019/0060857 A1* | 2/2019 | Tincher | G01F 23/2921 |

FOREIGN PATENT DOCUMENTS

| | | |
|---|---|---|
| DE | 11 19 532 B | 12/1961 |
| DE | 86 27 669 U1 | 12/1986 |
| DE | 39 10 250 A1 | 10/1990 |
| DE | 20 2007 017 548 U1 | 7/2008 |
| EP | 0 238 809 A2 | 9/1987 |
| EP | 0 753 722 A2 | 1/1997 |
| JP | 61-3034 A | 1/1986 |
| WO | WO 2017/216675 A1 | 12/2017 |

\* cited by examiner

OPTICAL OPERATING FLUID DETECTOR FOR THE OPTICAL DETECTION OF OPERATING FLUID FOR A HAND-GUIDED GARDEN, FORESTRY AND/OR CONSTRUCTION MACHINING APPLIANCE, AND HAND-GUIDED GARDEN, FORESTRY AND/OR CONSTRUCTION MACHINING APPLIANCE

CROSS REFERENCE TO RELATED APPLICATION

This application claims priority under 35 U.S.C. § 119 from European Patent Application No. 19216523.1, filed Dec. 16, 2019, the entire disclosure of which is herein expressly incorporated by reference.

BACKGROUND AND SUMMARY OF THE INVENTION

The invention relates to an optical operating fluid detector for the optical detection of operating fluid for a hand-guided garden, forestry and/or construction machining appliance and to a hand-guided garden, forestry and/or construction machining appliance having such an optical operating fluid detector.

The invention addresses the problem of providing an optical operating fluid detector for the optical detection of operating fluid for a hand-guided garden, forestry and/or construction machining appliance, the operating fluid detector having improved properties, and of providing a hand-guided garden, forestry and/or construction machining appliance having such an optical operating fluid detector.

The invention solves the problem by providing an optical operating fluid detector and a hand-guided garden, forestry and/or construction machining appliance with the features of the independent claims. Advantageous developments and/or embodiments of the invention are described in the dependent claims.

The, in particular electrical, optical operating fluid detector according to the invention is designed or configured for the, in particular automatic, optical detection of operating fluid for a hand-guided garden, forestry and/or construction machining appliance. The operating fluid detector has a, in particular electrical, light source, an operating fluid line and a, in particular electrical, light receiver. The light source is designed or configured for the, in particular automatic, radiation or emission of rays of light. The operating fluid line is designed or configured for the optical interaction of, radiated, rays of light from the light source with operating fluid, if present, in the operating fluid line for the optical detection of, in particular the, operating fluid. The light receiver is designed or configured for the, in particular automatic, differing reception of, in particular interacted, rays of light from the operating fluid line in dependence on, in particular either, the presence or the absence of operating fluid in the operating fluid line.

In addition, the operating fluid detector has at least one optical deflecting device. The at least one deflecting device is designed or configured for the deflection, in particular directional deflection, of, in particular radiated, rays of light from the light source to the operating fluid line and/or for the deflection, in particular directional deflection, of, in particular interacted, rays of light from the operating fluid line to the light receiver.

In addition or as an alternative, the operating fluid line, in particular an inner surface of the operating fluid line, is designed or configured, in particular aligned and/or formed, for the differing diversion, in particular directional diversion, of, in particular radiated, rays of light from the light source in dependence on the presence or the absence of operating fluid in the operating fluid line for the optical detection of operating fluid.

This, in particular the optical detection of operating fluid, makes it possible for a user to perceive whether operating fluid is present or absent.

In addition, this, in particular the at least one deflecting device, makes possible freedoms in relation to a spatial arrangement and/or an alignment of the light source, the operating fluid line and the light receiver in relation to one another. In particular, the light source, the operating fluid line and the light receiver need not or may not be spatially arranged in this sequence on a straight line.

In addition or as an alternative, this, in particular the differing diversion, makes possible the optical detection of operating fluid that has a low or even no or an unknown absorption of rays of light from the light source.

In particular, the operating fluid may be a lubricating fluid and/or oil.

The light source may have, in particular be, a light-emitting diode.

The light receiver may have, in particular be, a photodiode.

The rays of light may have a wavelength(s) that are visible to the human eye, in particular red, and/or a shorter wavelength(s) (ultraviolet) and/or a greater wavelength(s) (infrared).

The operating fluid line may be transmitting for rays of light, in particular have a transmittance of, as a minimum, 50 percent (%), in particular and as a maximum, 100%, in particular of approximately 90%. This can make the optical interaction and reception possible. In particular, the operating fluid line may at least partially or even completely consist of a, in particular transparent and/or thermoplastic, plastic, in particular PA (polyamide) and/or PMMA (polymethylmethacrylate), in particular Grilamid TR90. In addition or as an alternative, the operating fluid line may have, in particular be, a pipe. Also in addition or as an alternative, the operating fluid line may have a round and/or cylindrical inner form. Also in addition or as an alternative, an inside diameter of the operating fluid line may be, as a minimum, 1 millimetre (mm), in particular, as a minimum, 2 mm, and/or, as a maximum, 10 mm, in particular, as a maximum, 5 mm, in particular 3 mm. Also in addition or as an alternative, in the absence of operating fluid, air may be present in the operating fluid line.

The reception may differ between the presence and the absence by a factor of, as a minimum, 2, in particular, as a minimum, 4, in particular and as a maximum, 100.

The deflection may be by, as a minimum, 45 degrees (°) and/or, as a maximum, 180°, in particular 90°. In addition or as an alternative, the at least one deflecting device of the light source, the operating fluid line and/or the light receiver may differ. Also in addition or as an alternative, the at least one deflecting device need not or may not be a lens.

The diversion may differ, in particular on average, by, as a minimum, 5° and/or, as a maximum, 20°, in particular 10°. In addition or as an alternative, the operating fluid line need not or may not be designed for diverting either in the case of presence or in the case of absence.

The operating fluid detector may have a, in particular electrical, output device. The output device may be designed for the, automatic, output of a, in particular user-perceptible and/or electrical, detection signal and/or a, in particular user-perceptible and/or electrical, non-detection signal in dependence on the, in particular differing, reception.

In a development of the invention, the at least one deflecting device is designed or configured for deflection on the basis of reflection. In particular, the at least one deflecting device is at least one mirror, in particular at least one concave mirror, in particular at least one parabolic mirror. In particular, the at least one deflecting device may have a reflectance of, as a minimum, 50%, in particular and as a maximum, 100%.

In a development of the invention, the operating fluid detector has a, in particular one-piece, optical body. The body has the operating fluid line and the at least one deflecting device. This makes possible few parts and/or a defined spatial arrangement and/or a defined alignment of the operating fluid line and the at least one deflecting device in relation to one another. This makes possible a simple assembly of the operating fluid detector. In particular, the body may be transmitting for rays of light, in particular have a transmittance of, as a minimum, 50%, in particular and as a maximum, 100%, in particular of approximately 90%. In particular, the body may at least partially or even completely consist of a, in particular transparent and/or thermoplastic, plastic, in particular PA (polyamide) and/or PMMA (polymethylmethacrylate), in particular Grilamid TR90. In addition or as an alternative, the operating fluid line may be spatially arranged in the interior of the body.

In an embodiment of the invention, the at least one deflecting device has at least one point of a surface of the body a reflection coating, in particular for deflection on the basis of reflection. This makes possible simple production of the at least one deflecting device, in particular by means of vapour deposition of the reflection coating. In particular, the at least one deflecting device may be a reflection coating at least one point of a surface of the body. In addition or as an alternative, the reflection coating may at least partially or even completely consist of metal.

In a development of the invention, the operating fluid detector has a, in particular electrical, printed circuit board. The printed circuit board carries the light source and the light receiver, in particular and the operating fluid line and/or the at least one deflecting device, if present, in particular the body, if present. The light source is aligned for the radiation of rays of light, in particular orthogonally, away from a board plane of the printed circuit board. The light receiver is aligned for the reception of rays of light from the operating fluid line, in particular orthogonally, towards the board plane. This makes possible a spatial arrangement of the light source and the light receiver in each case with a large area on the printed circuit board or lying of the light source and the light receiver in each case on the printed circuit board. In particular, the light source and the light receiver need not or may not in each case be located on the printed circuit board. In particular, away from the board plane and/or towards the board plane may mean non-parallel to the board plane and/or at an angle of, as a minimum, 45°, in particular and as a maximum 90°, to the board plane. In addition or as an alternative, the light source and the light receiver, in particular and the operating fluid line and/or the at least one deflecting device, in particular the body, may be spatially arranged on the same side of the printed circuit board and/or directly or without any distance on the printed circuit board.

In a development of the invention, the operating fluid line is aligned, in particular in relation to the light source and/or the deflecting device, if present, in such a way that rays of light from the light source impinge on the operating fluid line, in particular an inner surface of the operating fluid line, non-parallel, in particular orthogonally, in relation to the operating fluid line, in particular a longitudinal axis of the operating fluid line. This makes possible the differing diversion. In particular, non-parallel may mean at an angle of, as a minimum, 45°, in particular and as a maximum 90°, to the operating fluid line.

In a development of the invention, the operating fluid line, in particular a, in particular the, inner surface of the operating fluid line, is designed or configured, in particular aligned and/or formed, in particular as round, for the differing refraction of, in particular radiated, rays of light from the light source in dependence on the presence or the absence of operating fluid in the operating fluid line for the optical detection of, in particular the, operating fluid. This makes possible the optical detection of operating fluid that has a low or even no or an unknown absorption of rays of light from the light source. In particular, the refraction may differ, in particular on average, by, as a minimum, 5° and/or, as a maximum 20°, in particular 10°. In addition or as an alternative, the operating fluid line need not or may not be designed for refraction either in the case of presence or in the case of absence.

In an embodiment of the invention, a refractive index of the operating fluid line, in particular a wall of the operating fluid line, in particular of the body, if present, is greater than 1, in particular, as a minimum, 1.3, in particular and as a maximum, 3, in particular 1.5, and/or similar, in particular equal, to a refractive index of, in particular the, operating fluid. This makes possible the differing refraction. In particular, a refractive index of air is 1. In addition or as an alternative, the refractive index of operating fluid, in particular lubricating fluid and/or oil, may be as a minimum 1.3, in particular and as a maximum 3, in particular 1.5.

In a development of the invention, the operating fluid detector is designed or configured in such a way that the light receiver receives more rays of light from the operating fluid line in the case of the presence of operating fluid in the operating fluid line than in the case of the absence of operating fluid in the operating fluid line.

In a development of the invention, the light receiver is designed or configured for the, in particular automatic, measurement of an intensity, in particular an intensity value of the intensity, of the received rays of light. The operating fluid detector has a, in particular the and/or electrical, output device. The output device is designed or configured for the, in particular automatic, output of a, in particular user-perceptible and/or electrical, detection signal when a detection intensity limit value is reached and/or overshot by the measured intensity and/or for the, in particular automatic, output of a, in particular user-perceptible and/or electrical, non-detection signal when a non-detection intensity limit value is undershot by the measured intensity. In particular, the detection intensity limit value and the non-detection intensity limit value may differ. In particular, the detection intensity limit value may be greater than the non-detection intensity limit value. This may make it possible to avoid the output being made to flicker back and forth, in particular blink, by small and/or a few air bubbles in the operating fluid in the operating fluid line and/or small and/or a few drops of operating fluid in the air in the operating fluid line. In addition or as an alternative, the detection signal and the non-detection signal may differ. Also in addition or as an alternative, the output may be optical, acoustic and/or haptic.

In a development of the invention, the operating fluid detector has a, in particular the and/or electrical, output device. The output device is designed or configured for the, in particular automatic, output of a, in particular the and/or user-perceptible and/or electrical, detection signal when there is, in particular continuous, detection of operating fluid for a first minimum time period and/or for the, in particular automatic, output of a, in particular the and/or user-perceptible and/or electrical, non-detection signal when there is, in particular continuous, non-detection of operating fluid for a second minimum time period. This makes it possible to avoid the output being made to flicker back and forth, in particular blink, by small and/or a few air bubbles in the operating fluid in the operating fluid line and/or small and/or a few drops of operating fluid in the air in the operating fluid line. In particular, the first minimum time period and the second minimum time period may differ. In addition or as an alternative, the detection signal and the non-detection signal may differ. Also in addition or as an alternative, the output may be optical, acoustic and/or haptic.

In a development of the invention, the operating fluid detector is designed or configured in such a way that, with a, in particular faultlessly, radiating light source, the, in particular faultless, light receiver receives rays of light, in particular from the light source, in the case of the presence and in the case of the absence of operating fluid in the, in particular faultless, operating fluid line. The operating fluid detector has a, in particular the and/or automatic, output device. The output device is designed or configured for the, in particular automatic, output of a, in particular user-perceptible and/or electrical, fault signal in the case of non-reception. This makes it possible to detect whether the light source, the operating fluid line and/or the light receiver, in particular and/or the at least one deflecting device, if present, in particular the body, if present, are/is faultless or faulty. In particular, non-reception may mean undershooting of a fault intensity limit value by the measured intensity, in particular wherein the fault intensity limit value may be smaller than the non-detection intensity limit value, if present. In addition or as an alternative, the fault signal may differ from the detection signal, if present, and/or the non-detection signal, if present. Also in addition or as an alternative, the output may be optical, acoustic and/or haptic.

In a development of the invention, the operating fluid line is or runs straight, in particular from a line inlet, in particular inclusively, up to a line outlet, in particular inclusively, of the operating fluid line. This makes it possible to keep down a loss of pressure caused by the operating fluid line.

In a development, in particular an embodiment, of the invention, the operating fluid detector has a sealing compound. The sealing compound protects the light source and/or the light receiver and/or the at least one deflecting device, if present, in particular the body, if present, and/or the printed circuit board, if present, and/or the output device, if present, in particular from weathering influences, such as for example dirt, water and moisture.

The hand-guided garden, forestry and/or construction machining appliance according to the invention has an operating fluid tank, an operating fluid pump and a, in particular the, optical operating fluid detector as described above. The operating fluid tank is designed or configured for the storage of operating fluid. The operating fluid pump is designed or configured for the, in particular automatic, delivery of operating fluid from the operating fluid tank. The operating fluid line is connected downstream of the operating fluid tank, in particular and, in particular either, upstream or downstream of the operating fluid pump.

This, in particular the operating fluid detector, makes it possible to detect whether operating fluid is present or absent in the operating fluid tank, and consequently whether or not operating fluid needs to be filled into the operating fluid tank. In particular, connection upstream of the operating fluid pump can make it possible to keep down a distance from the operating fluid tank, and consequently to quickly recognize or detect replenished operating fluid and/or to avoid damage to the operating fluid detector caused by a possible blockage downstream of the operating fluid pump. Alternatively, connection downstream of the operating fluid pump can make possible and/or can make use of advantages in terms of installation space.

In particular, the garden, forestry and/or construction machining appliance may be a ground-guided or hand-carried garden, forestry and/or construction machining appliance. In addition or as an alternative, a hand-guided, in particular hand-carried, garden, forestry and/or construction machining appliance may mean that the garden, forestry and/or construction machining appliance can have a maximum mass of 50 kilograms (kg), in particular of 20 kg, in particular of 10 kg.

The garden, forestry and/or construction machining appliance may have a drive motor. In addition or as an alternative, the garden, forestry and/or construction machining appliance may have a machining tool, in particular wherein the drive motor may be designed for driving the machining tool. Also in addition or as an alternative, the drive motor may be designed for driving the operating fluid pump. Also in addition or as an alternative, the operating fluid pump may be designed for the delivery of operating fluid to the machining tool, in particular for lubricating the machining tool with operating fluid in the form of lubricating fluid.

The garden, forestry and/or construction machining appliance, in particular the operating fluid pump, may be designed for a delivery rate of operating fluid of, as a minimum, 1 cubic centimetre per minute (ccm/min), in particular a minimum of 3.5 ccm/min, and/or a maximum of 50 ccm/min, in particular a maximum of 15 ccm/min.

The operating fluid line may be connected to the operating fluid tank and/or the operating fluid pump and/or the machining tool, if present, for a flow of operating fluid.

In a development of the invention, the garden, forestry and/or construction machining appliance is a saw, a pole-mounted pruner, a brush cutter, hedge clippers, hedge cutters, a blower, a leaf blower, a lopper, an angle grinder, a sweeper, a sweeping roller, a sweeping brush, a lawnmower, a scarifier, grass trimmers or a cleaning appliance, such as for example a sprayer or a high-pressure cleaner.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 12:
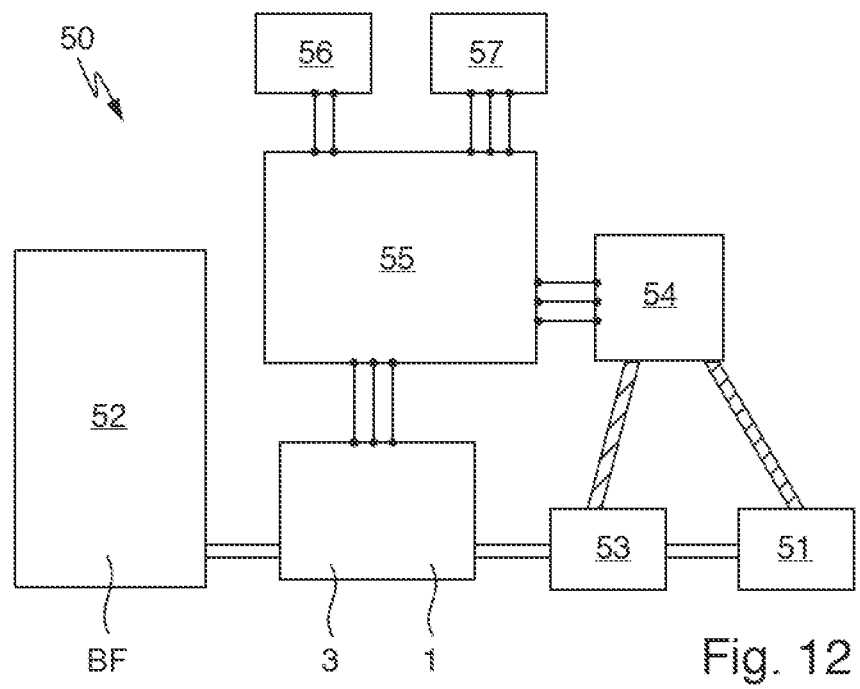
FIG. 12 shows a schematic view of a hand-guided garden, forestry and/or construction machining appliance according to an embodiment the invention having the operating fluid detector from FIG. 1 or from FIG. 10.
Figure 13:
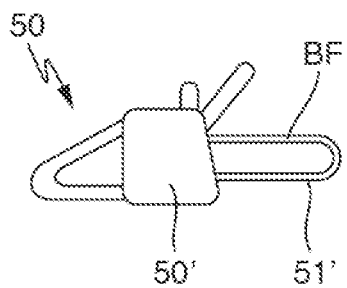
FIG. 13 shows a perspective view of the garden, forestry and/or construction machining appliance from FIG. 12.

FIGS. 1 to 9 and 10 show, in particular in each case, an optical operating fluid detector 1 for the optical detection of operating fluid BF for a hand-guided garden, forestry and/or construction machining appliance 50, as shown in FIGS. 12 and 13. The operating fluid detector 1 has a light source 2, an operating fluid line 3 and a light receiver 4. The light source 2 is designed for the radiation of rays of light aLS. The operating fluid line 3 is designed for the optical interaction of rays of light aLS from the light source 2 with operating fluid BF in the operating fluid line 3 for the optical detection of operating fluid BF. The light receiver 4 is designed for the differing reception of rays of light tLS from the operating fluid line 3 in dependence on the presence or the absence of operating fluid BF in the operating fluid line 3.

In addition, in the exemplary embodiment shown in FIGS. 1 to 9, the operating fluid detector 1 has at least one optical deflecting device 5a, 5b. The at least one deflecting device 5a, 5b is designed for the deflection of rays of light aLS from the light source 2, in particular in the direction y, to the operating fluid line 3, in particular in the direction x orthogonal to the direction y, and/or for the deflection of rays of light tLS from the operating fluid line 3, in particular in the direction x, to the light receiver 4, in particular in the direction −y.

In addition, in the exemplary embodiments shown, the operating fluid line 3 is designed for the differing diversion of rays of light aLS from the light source 2 in dependence on the presence or the absence of operating fluid BF in the operating fluid line 3 for the optical detection of operating fluid BF.

In particular, in the exemplary embodiment shown in FIGS. 1 to 9, the operating fluid detector 1 has two optical deflecting devices 5a, 5b. The one deflecting device 5a is designed for the deflection of rays of light aLS from the light source 2 to the operating fluid line 3. The other deflecting device 5b is designed for the deflection of rays of light tLS from the operating fluid line 3 to the light receiver 4.

Figure 10:
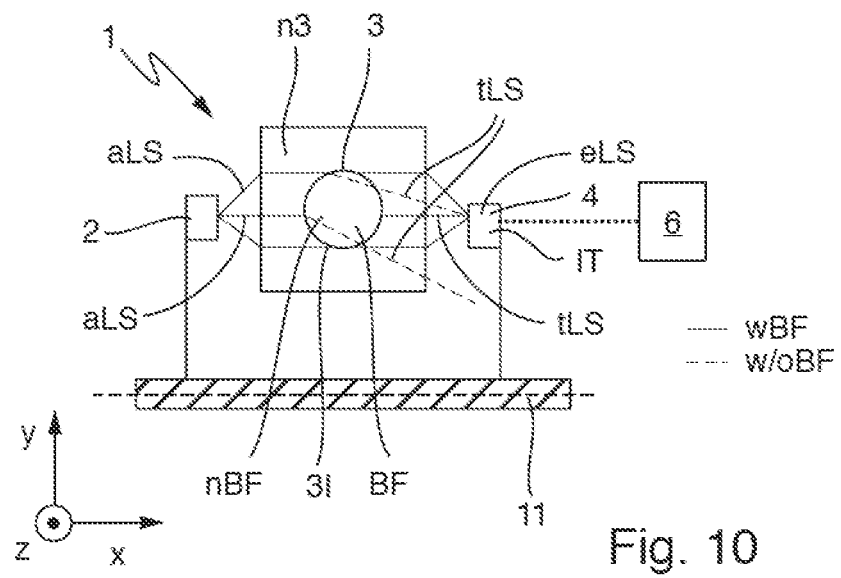
FIG. 10 shows a schematic view of an optical function of a further optical operating fluid detector according to an embodiment of the invention.

In alternative exemplary embodiments, the operating fluid detector needs or may have only a single optical deflecting device, wherein the deflection device may be designed either for the deflection of rays of light from the light source to the operating fluid line or for the deflection of rays of light from the operating fluid line to the light receiver, or even no optical deflecting device, as shown in FIG. 10.

In detail, the at least one deflecting device 5a, 5b is designed for deflection on the basis of reflection. In particular, the at least one deflecting device 5a, 5b is at least one mirror 7a, 7b, in particular at least one concave mirror, in particular at least one parabolic mirror.

What is more, in the exemplary embodiment shown in FIGS. 1 to 9, the operating fluid detector 1 has an optical body 9. The body 9 has the operating fluid line 3 and the at least one deflecting device 5a, 5b.

In detail, the at least one deflecting device 5a, 5b has at least one point of a surface 9Oa, 9Ob of the body 9 a reflection coating 10a, 10b.

Also, in the exemplary embodiments shown, the operating fluid detector 1 has a printed circuit board 11. The printed circuit board 11 carries the light source 2 and the light receiver 4, in particular and the operating fluid line 3 and/or the at least one deflecting device 5a, 5b, if present, in particular the body 9, if present, in particular on a same side of the printed circuit board 11.

In the exemplary embodiment shown in FIGS. 1 to 9, the light source 2 is aligned away from a board plane 11E of the printed circuit board 11 for the radiation of rays of light aLS, in particular in the direction y. The light receiver 4 is aligned towards the board plane 11E for the reception of rays of light from the operating fluid line, in particular in the direction −y.

Furthermore, in the exemplary embodiments shown, the operating fluid line 3 is aligned, in particular in relation to the light source 2 and/or the deflecting device 5a, if present, in such a way that rays of light aLS from the light source 2 impinge on the operating fluid line 3, in particular an inner surface 3I of the operating fluid line 3, non-parallel, in particular orthogonally, in relation to the operating fluid line 3.

To sum up, in the exemplary embodiment shown in FIGS. 1 to 9, the one deflecting device 5a, the operating fluid line 3, in particular transversely, and the other deflecting device 5b are spatially arranged in this sequence on a straight line, in particular in direction x.

In the exemplary embodiment shown in FIG. 10, the light source 2, the operating fluid line 3, in particular transversely, and the light receiver 4, are spatially arranged in this sequence on a straight line, in particular in direction x.

Moreover, the operating fluid line 3, in particular the inner surface 3I of the operating fluid line 3, is designed, in particular aligned and/or formed, in particular as round, for the differing refraction of rays of light aLS from the light source 2 in dependence on the presence or the absence of operating fluid BF in the operating fluid line 3 for the optical detection of operating fluid BF.

In detail, a refractive index n3 of the operating fluid line 3, in particular of the body 9, if present, is greater than 1, in particular, as a minimum, 1.3, and/or similar to a refractive index nBF of operating fluid BF.

In the exemplary embodiments shown, the refractive index n3 and the refractive index nBF are in each case 1.5.

What is more, the operating fluid detector 1 is designed in such a way that the light receiver 2 receives more rays of light tLS from the operating fluid line 3 in the case of the presence of operating fluid BF in the operating fluid line 3 than in the case of the absence of operating fluid BF in the operating fluid line 3.

Also, the light receiver 4 is designed for the measurement of an intensity IT of the received rays of light eLS.

Furthermore, the operating fluid detector 1 has an output device 6, in the exemplary embodiments shown in the form of a microcontroller.

Figure 11:
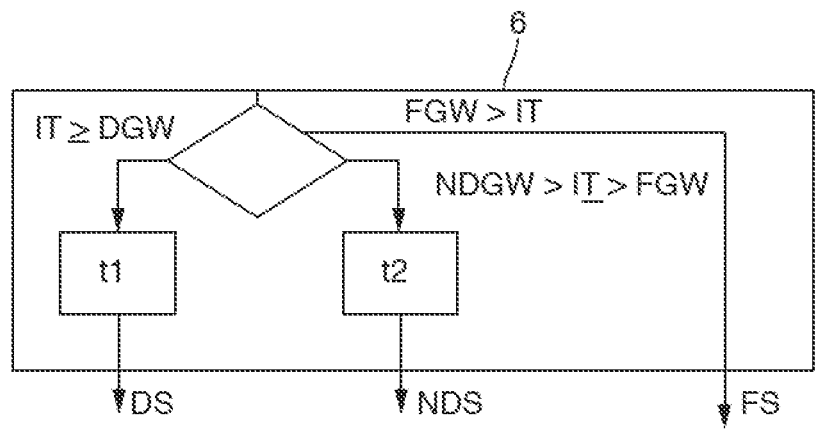
FIG. 11 shows a schematic view of an electrical and/or logical function of the operating fluid detector from FIG. 1 and from FIG. 10.

The output device 6 is designed for the output of a, in particular electrical, detection signal DS when a detection intensity limit value DGW is reached and/or overshot by the measured intensity IT and/or for the output of a, in particular electrical, non-detection signal NDS when a non-detection intensity limit value NDGW is undershot by the measured intensity IT, as shown in FIG. 11.

Figure 9:
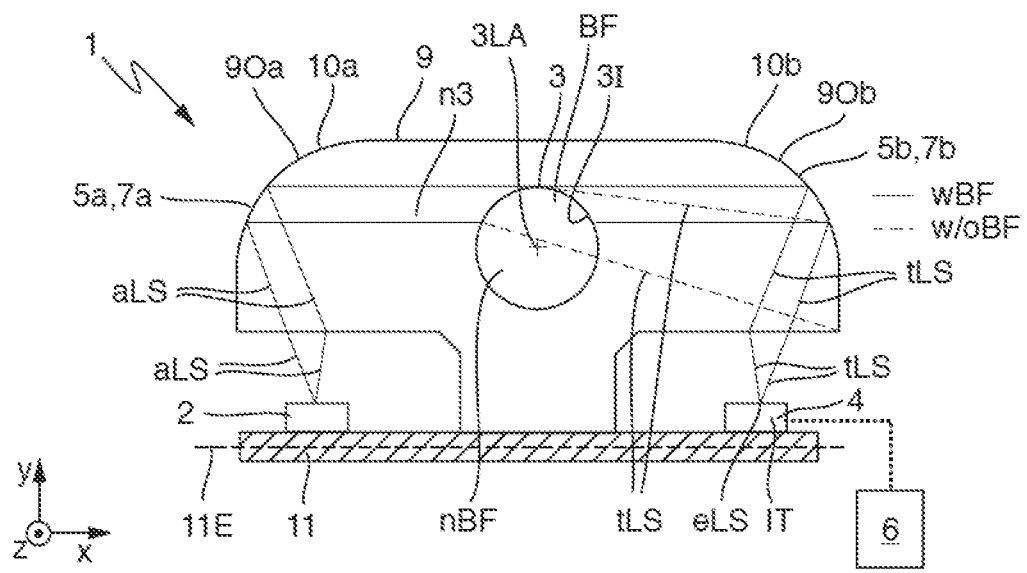
FIG. 9 shows a schematic view of an optical function of the operating fluid detector from FIG. 1.

In detail, the output device 6 is operatively connected, in particular signal-connected, to the light receiver 4, as shown in FIGS. 9 and 10 by means of a dotted line.

In the exemplary embodiments shown, the detection intensity limit value DGW is greater than the non-detection intensity limit value NDGW.

In addition, the output device 6 is designed for the output of the detection signal DS when there is detection of operating fluid BF for a first minimum time period t1 and/or for the output of the non-detection signal NDS when there is non-detection of operating fluid BF for a second minimum time period t2.

In the exemplary embodiments shown, the first minimum time period t1 and the second minimum time period t2 differ. In particular, the first minimum time period t1 is 1 second (s) and the second minimum time period t2 is 0.5 s.

Moreover, the operating fluid detector 1 is designed in such a way that, with a radiating light source 2, the light receiver 4 receives rays of light tLS in the case of the presence and in the case of the absence of operating fluid BF in the operating fluid line 3, as shown in FIGS. 9 and 10.

The output device 6 is designed for the output of a, in particular electrical, fault signal FS in the case of non-reception, as shown in FIG. 11.

In detail, non-reception means undershooting of a fault intensity limit value FGW by the measured intensity IT, the fault intensity limit value FGW being smaller than the non-detection intensity limit value NDGW. The output device 6 is designed for the output of the non-detection signal NDS when the non-detection intensity limit value NDGW is undershot and when the fault intensity limit value FGW is reached and/or overshot by the measured intensity IT.

What is more, the operating fluid line 3 is straight, in particular from a line inlet 14 up to a line outlet 15 of the operating fluid line 3, in particular in the direction z orthogonal to the direction y and/or the direction x.

Figure 1:
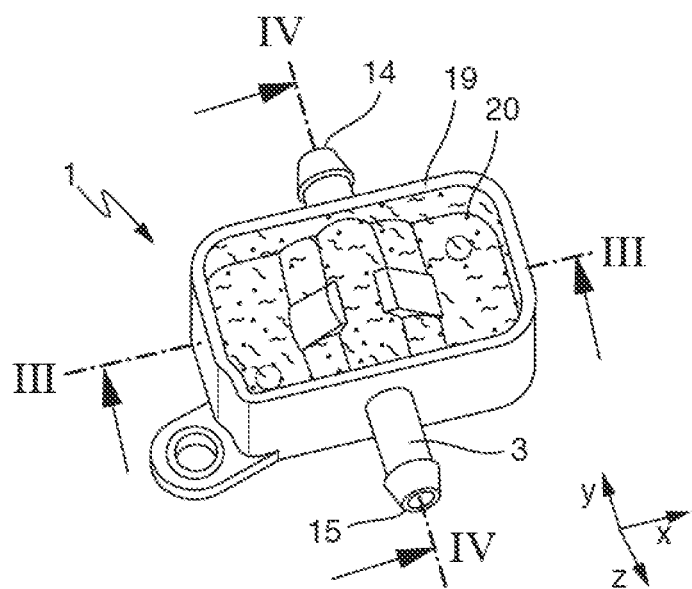
FIG. 1 shows a perspective view of an upper side of an optical operating fluid detector according to an embodiment of the invention with a sealing compound.
Figure 2:
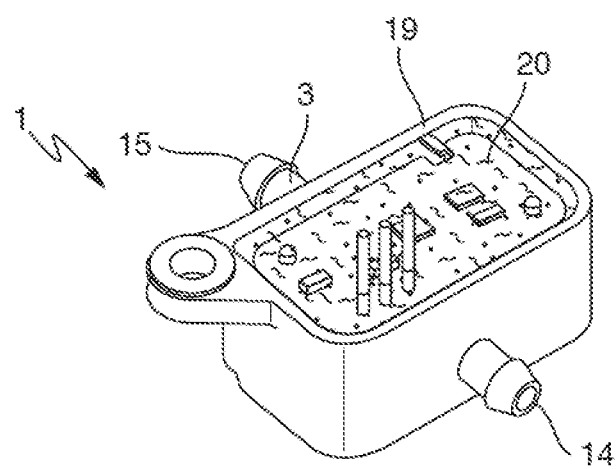
FIG. 2 shows a perspective view of an underside of the operating fluid detector from FIG. 1 with a sealing compound.
Figure 2:
Figure 3:
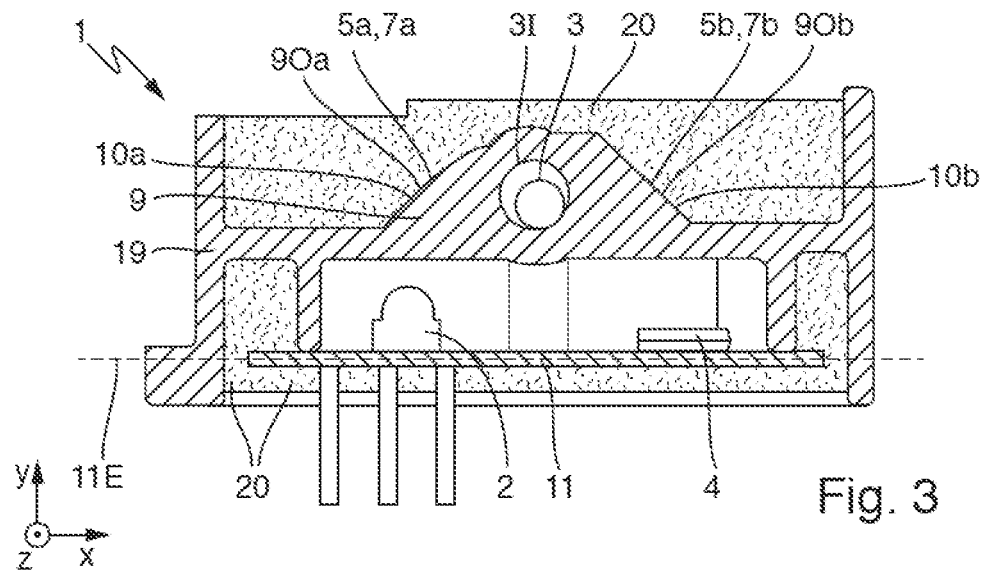
FIG. 3 shows a longitudinal sectional view of the operating fluid detector from FIG. 1 with a sealing compound.
Figure 4:
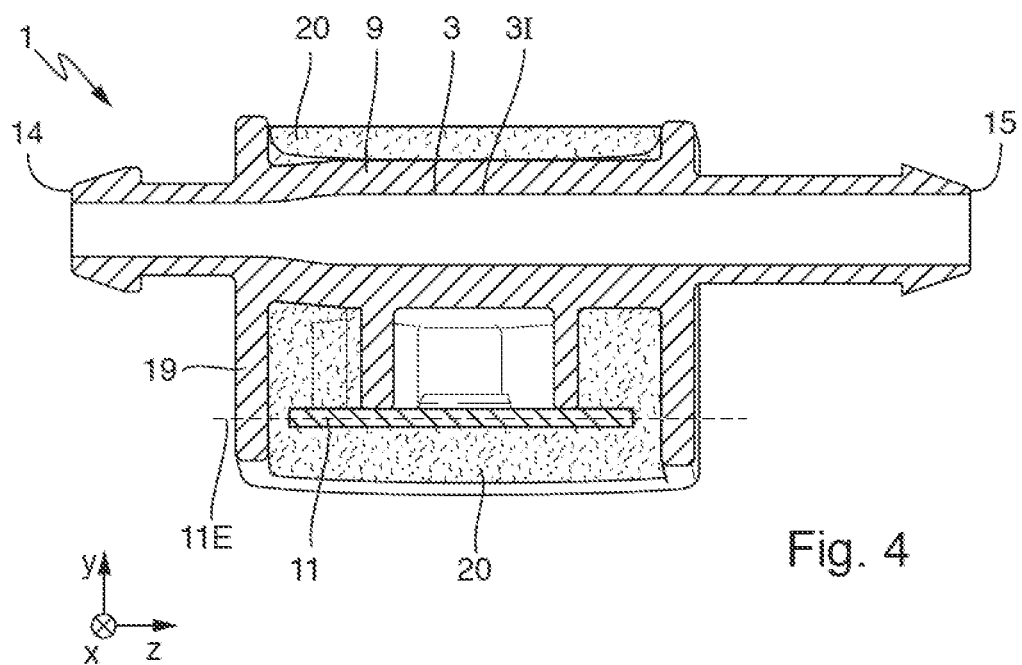
FIG. 4 shows a cross-sectional view of the operating fluid detector from FIG. 1 with a sealing compound.
Figure 5:
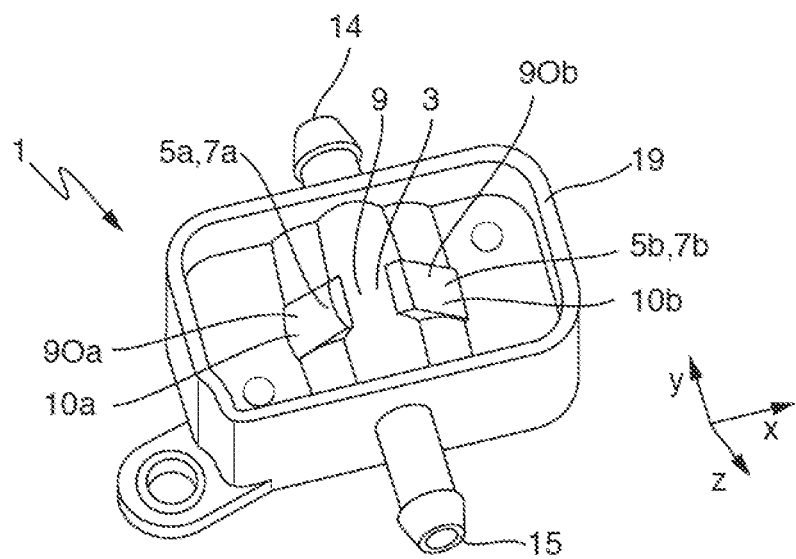
FIG. 5 shows a perspective view of the upper side of the operating fluid detector from FIG. 1 without a sealing compound, in particular an optical body having an operating fluid line and at least one deflecting device of the operating fluid detector from FIG. 1.
Figure 6:
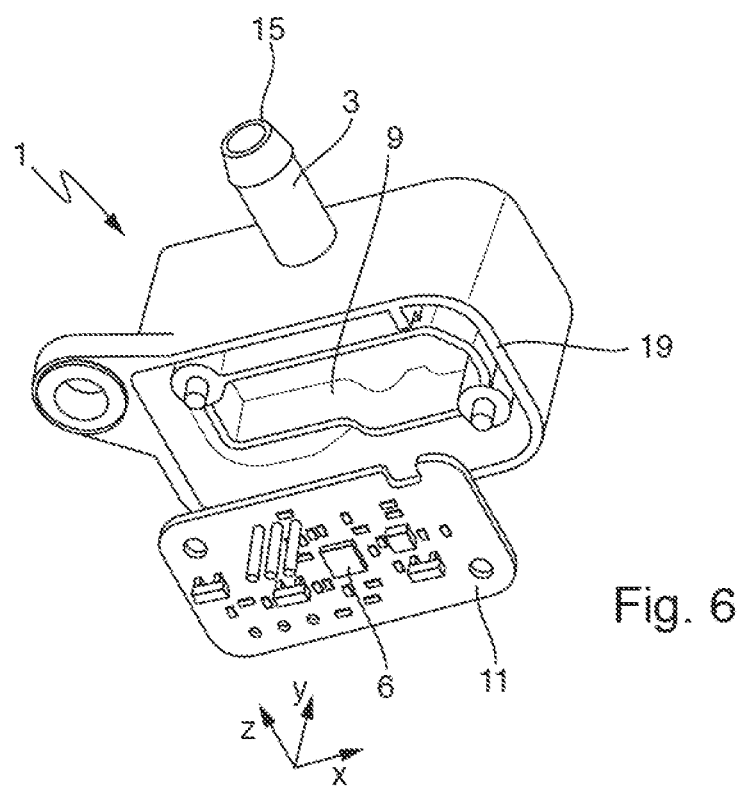
FIG. 6 shows a perspective view of the underside of the operating fluid detector from FIG. 1 without a sealing compound in an exploded representation, in particular the optical body and a printed circuit board of the operating fluid detector from FIG. 1.
Figure 7:
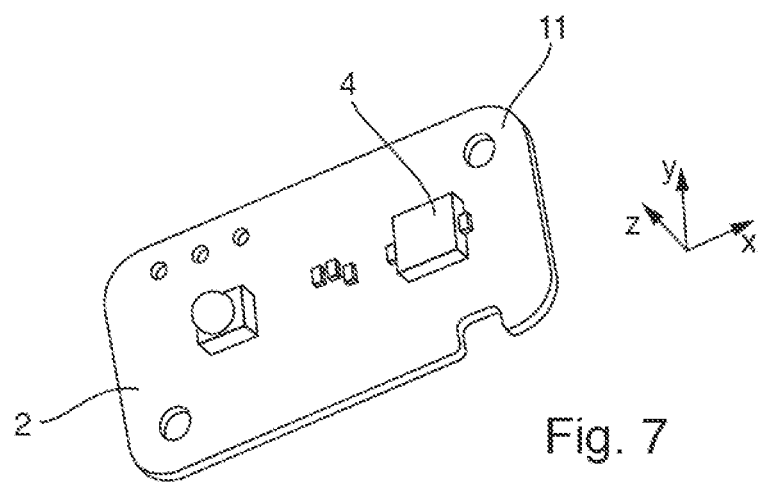
FIG. 7 shows a perspective view of the printed circuit board from FIG. 6 carrying a light source and a light receiver of the operating fluid detector from FIG. 1.
Figure 8:
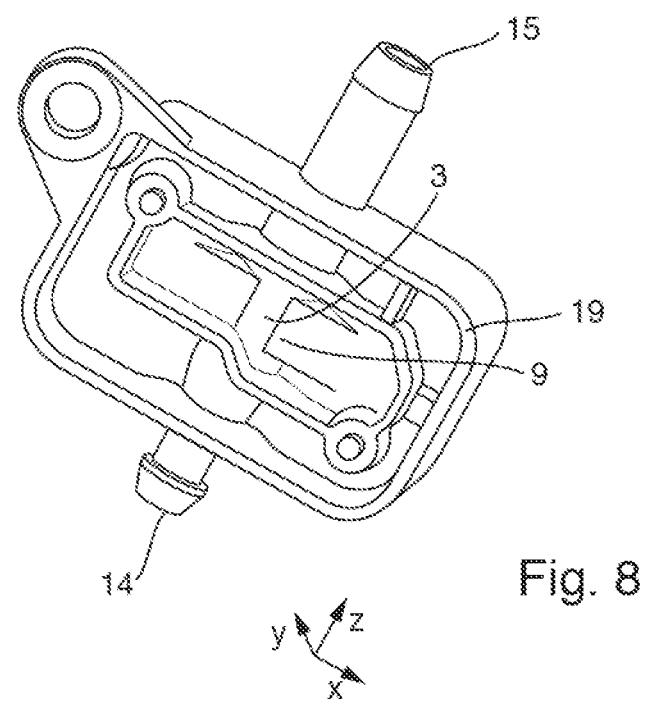
FIG. 8 shows a perspective view of the underside of the operating fluid detector from FIG. 1 without a sealing compound and without the printed circuit board, in particular of the body.

In detail, the operating fluid line 3 has a smaller diameter at the line inlet 14 than over the rest of it, to use operating fluid hose sold by the metre, as shown in FIG. 4. The operating fluid line 3 has a greater diameter over the rest of it, in particular at a point of interaction with rays of light aLS, to make an ideal signal swing possible in a small installation space.

Also, the operating fluid detector 1 has a housing or a potting cup 19. Arranged in the housing 19 are the light source 2, the operating fluid line 3 and the light receiver 4, in particular and the at least one deflecting device 5a, 5b, if present, in particular the body 9, if present, the printed circuit board 11 and the output device 6.

In the exemplary embodiment shown in FIGS. 1 to 9, the body 9 is part of the housing 19.

In detail, the body 9 or the housing 19 has pins for a spatial arrangement and/or an alignment or a positioning with respect to the printed circuit board 11.

Furthermore, the operating fluid detector 1 has a sealing compound 20. The sealing compound 20 protects the light source 2 and/or the light receiver 4 and/or the at least one deflecting device 5a, 5b, if present, in particular the body 9, if present, and/or the printed circuit board 11 and/or the output device 6.

In particular, the sealing compound 20 is in the form of a potting compound. The housing 19 is potted by means of the sealing compound 20 in the form of the potting compound.

To sum up, in the exemplary embodiment shown in FIGS. 1 to 9, the operating fluid detector 1 functions optically as follows: the light source 2 radiates out rays of light aLS, in particular in the direction y. Rays of light aLS from the light source 2 impinge on the one deflecting device 5a. The one deflecting device 5a deflects rays of light aLS from the light source 2 towards the operating fluid line 3, in particular in the direction x and/or by 90°. In particular deflected, rays of light aLS from the light source 2 impinge on the operating fluid line 3, in particular the inner surface 3I of the operating fluid line 3, non-parallel, in particular orthogonally, in relation to the operating fluid line 3.

In the case of the presence of operating fluid BF in the operating fluid line 3, the operating fluid line 3, in particular the inner surface 3I, does not divert, in particular does not refract, rays of light aLS from the light source 2, as shown in FIG. 9 by means of solid lines. In other words: at the inner surface 3I or boundary surface between two media of the same refractive index, rays of light aLS are not refracted and do not change direction. In particular, consequently, rays of light aLS are not fanned out. Consequently, many, in particular not diverted, rays of light tLS from the operating fluid line 3 impinge on the other deflecting device 5b. Consequently, the other deflecting device 5b deflects many, in particular not diverted, rays of light tLS from the operating fluid line 3 to the light receiver 4, in particular in the direction −y and/or by 90°. Consequently, the light receiver 4 receives many, in particular not diverted, rays of light tLS from the operating fluid line 3. Consequently, the light receiver 4 measures a great intensity IT of the received rays of light eLS.

In the case of the absence of operating fluid BF or the presence of air in the operating fluid line 3, the operating fluid line 3, in particular the inner surface 3I, diverts, in particular refracts, rays of light aLS from the light source 2, in particular on average by 10°, as shown in FIG. 9 by means of dashed lines. In other words: at the inner surface 3I or boundary surface between two media of different refractive indices, rays of light aLS are refracted and change direction. In particular, consequently, rays of light aLS are fanned out. Consequently, few rays of light tLS from the operating fluid line 3 impinge on the other deflecting device 5b. Consequently, the other deflecting device 5b deflects few rays of light tLS from the operating fluid line 3 to the light receiver 4. Consequently, the light receiver 4 receives few rays of light tLS from the operating fluid line 3. Consequently, the light receiver 4 measures a small intensity IT of the received rays of light eLS.

Consequently, the light receiver 2 receives more rays of light tLS from the operating fluid line 3 in the case of the presence of operating fluid BF in the operating fluid line 3 than in the case of the absence of operating fluid BF in the operating fluid line 3.

In the exemplary embodiment shown in FIG. 10, the operating fluid detector 1 functions optically as in the exemplary embodiment shown in FIGS. 1 to 9, with the exception of the deflection(s), specifically: the light source 2 radiates out rays of light aLS, in particular in the direction x. Rays of light aLS from the light source 2 impinge on the operating fluid line 3, in particular the inner surface 3I of the operating fluid line 3, non-parallel, in particular orthogonally, in relation to the operating fluid line 3.

In the case of the presence of operating fluid BF in the operating fluid line 3, the operating fluid line 3, in particular the inner surface 3I, does not divert, in particular does not refract, rays of light aLS from the light source 2, as shown in FIG. 10 by means of solid lines. Consequently, the light receiver 4 receives many, in particular not diverted, rays of light tLS from the operating fluid line 3. Consequently, the light receiver 4 measures a great intensity IT of the received rays of light eLS.

In the case of the absence of operating fluid BF or the presence of air in the operating fluid line 3, the operating fluid line 3, in particular the inner surface 3I, diverts, in particular refracts, rays of light aLS from the light source 2, in particular on average by 10°, as shown in FIG. 10 by means of dashed lines. Consequently, the light receiver 4 receives few rays of light tLS from the operating fluid line 3. Consequently, the light receiver 4 measures a small intensity IT of the received rays of light eLS.

Consequently, the light receiver 2 receives more rays of light tLS from the operating fluid line 3 in the case of the presence of operating fluid BF in the operating fluid line 3 than in the case of the absence of operating fluid BF in the operating fluid line 3.

In the exemplary embodiments shown, the operating fluid detector 1, in particular the output device 6, functions electrically and/or logically as follows:

When a detection intensity limit value DGW is reached and/or overshot by the measured intensity IT for the first minimum time period t1, the output device 6 outputs the detection signal DS. If, however, the output device 6 has previously output another signal, in particular the non-detection signal NDS, and the detection intensity limit value DGW is not reached and/or overshot by the measured intensity IT for the first minimum time period t1 but for a shorter time, the output device 6 continues to output the other signal.

When the non-detection intensity limit value NDGW is undershot and the fault intensity limit value FGW is reached and/or overshot by the measured intensity IT for the second minimum time period t2, the output device 6 outputs the non-detection signal NDS. If, however, the output device 6 has previously output another signal, in particular the detection signal DS, and the non-detection intensity limit value NDGW is undershot and the fault intensity limit value FGW is not reached and/or exceeded by the measured intensity IT for the second minimum time period t2 but for a shorter time, the output device 6 continues to output the other signal.

When the fault intensity limit value FGW is undershot by the measured intensity IT, the output device 6 outputs the fault signal FS.

FIGS. 12 and 13 show a hand-guided garden, forestry and/or construction machining appliance 50 according to the invention. The garden, forestry and/or construction machining appliance 50 has an operating fluid tank 52, an operating fluid pump 53 and the optical operating fluid detector 1 as described above. The operating fluid tank 52 is designed for the storage of operating fluid BF. The operating fluid pump 53 is designed for the delivery of operating fluid BF from the operating fluid tank 52. The operating fluid line 3 is connected downstream of the operating fluid tank 52, and, in the exemplary embodiment shown in FIG. 12, upstream of the operating fluid pump 53.

In alternative exemplary embodiments, the operating fluid line may be connected downstream of the operating fluid pump.

In the exemplary embodiment shown in FIG. 13, the garden, forestry and/or construction machining appliance 50 is a saw 50'.

In alternative exemplary embodiments, the garden, forestry and/or construction machining appliance may be a pole-mounted pruner, a brush cutter, hedge clippers, hedge cutters, a blower, a leaf blower, a lopper, an angle grinder, a sweeper, a sweeping roller, a sweeping brush, a lawnmower, a scarifier, grass trimmers or a cleaning appliance.

In detail, the garden, forestry and/or construction machining appliance 50 has a machining tool 51, in the exemplary embodiment shown in FIG. 13 a saw chain 51', a drive motor 54, motor electronics 55, a user-actuable operator control element 56 and a user output device 57, in particular a display.

The drive motor 54 is designed for driving the machining tool 51 and the operating fluid pump 53. The operating fluid pump 33 is designed for the delivery of operating fluid BF to the machining tool 51, in particular for lubricating the machining tool 51 with operating fluid BF in the form of lubricating fluid.

The user output device 57 is designed for the output of various user-perceptible signals or items of information in dependence on the output of the output device 6, in particular the detection signal DS and the non-detection signal NDS, in particular and the fault signal FS.

In detail, the user output device 57 is operatively connected, in particular signal-connected, to the output device 6.

As the exemplary embodiments shown and explained above make clear, the invention provides an optical operating fluid detector for the optical detection of operating fluid for a hand-guided garden, forestry and/or construction machining appliance, the operating fluid detector having improved properties, and provides a hand-guided garden, forestry and/or construction machining appliance having such an optical operating fluid detector.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A hand-guided garden, forestry and/or construction machining appliance, comprising:
   an operating fluid tank, the operating fluid tank being designed for storage of operating fluid;
   an operating fluid pump, the operating fluid pump being designed for delivery of operating fluid from the operating fluid tank; and
   an optical operating fluid detector for optical detection of operating fluid for the hand-guided garden, forestry and/or construction machining appliance, the operating fluid detector comprising:
      a light source, the light source being designed for radiation of rays of light;
      an operating fluid line, the operating fluid line being designed for optical interaction of the rays of light from the light source with operating fluid in the operating fluid line for the optical detection of operating fluid; and a light receiver, the light receiver being designed for differing reception of rays of light from the operating fluid line in dependence on a presence or absence of operating fluid in the operating fluid line, wherein the operating fluid detector has at least one optical deflecting device, the at least one optical deflecting device being designed for deflection of the rays of light from the light source to the operating fluid line and/or for deflection of the rays of light from the operating fluid line to the light receiver, the operating fluid line is designed for differing diversion of the rays of light from the light source in dependence on the presence or the absence of operating fluid in the operating fluid line for the optical detection of operating fluid, an inner surface of the operating fluid line is designed for the differing refraction of the rays of light from the light source in dependence on the presence or the absence of operating fluid in the operating fluid line for the optical detection of operating fluid, the operating fluid detector has an optical body, the body having the operating fluid line and the at least one optical deflecting device, the operating fluid detector has a printed circuit board, the printed circuit board carries the light source, the light receiver, and the body, the light source is aligned for the radiation of the rays of light away from a board plane of the printed circuit board, the light receiver is aligned for the reception of the rays of light from the operating fluid line towards the board plane, the operating fluid line is connected downstream of the operating fluid tank and upstream or downstream of the operating fluid pump, the garden, forestry and/or construction machining appliance has a machining tool, and the operating fluid pump is designed for the delivery of operating fluid to the machining tool for lubricating the machining tool with operating fluid in the form of lubricating fluid.

2. The hand-guided garden, forestry and/or construction matching appliance according to claim 1, wherein
the at least one optical deflecting device is designed for deflection based on reflection.

3. The hand-guided garden, forestry and/or construction machining appliance according to claim 2, wherein
the at least one optical deflecting device is a mirror.

4. The hand-guided garden, forestry and/or construction machining appliance according to claim 3, wherein
the mirror is a concave mirror or a parabolic mirror.

5. The hand-guided garden, forestry and/or construction machining appliance according to claim 2, wherein
the at least one optical deflecting device has at least one point of a surface of the body a reflection coating.

6. The hand-guided garden, forestry and/or construction machining appliance according claim 1, wherein
the light receiver is aligned for the reception of the rays of light from the operating fluid line orthogonally towards the board plane.

7. The hand-guided garden, forestry and/or construction machining appliance according to claim 6, wherein
the operating fluid detector has a sealing compound, the sealing compound protecting the light source, the light receiver, the at least one optical deflecting device, and/or the printed circuit board.

8. The hand-guided garden, forestry and/or construction machining appliance according to claim 1, wherein
the operating fluid line is aligned in such a way that the rays of light from the light source impinge on an inner surface of the operating fluid line, non-parallel, in relation to the operating fluid line.

9. The hand-guided garden, forestry and/or construction machining appliance according to claim 1, wherein
a refractive index of a wall of the operating fluid line is greater than 1 and/or similar to a refractive index of the operating fluid.

10. The hand-guided garden, forestry and/or construction machining appliance according to claim 1, wherein
the operating fluid detector is designed in such a way that the light receiver receives more rays of light from the operating fluid line in the case of the presence of operating fluid in the operating fluid line than in the case of the absence of operating fluid in the operating fluid line.

11. The hand-guided garden, forestry and/or construction machining appliance according to claim 1, wherein
the light receiver is designed for measurement of an intensity of the received rays of light, and
the operating fluid detector has an output device, the output device being designed for the output of a detection signal when a detection intensity limit value is reached and/or overshot by the measured intensity and/or for the output of a non-detection signal when a non-detection intensity limit value is undershot by the measured intensity.

12. The hand-guided garden, forestry and/or construction machining appliance according to claim 1, wherein
the operating fluid detector has an output device, the output device being designed for the output of a detection signal when there is detection of operating fluid for a first minimum time period and/or for the output of a non-detection signal when there is non-detection of operating fluid for a second minimum time period.

13. The hand-guided garden, forestry and/or construction machining appliance according to claim 12, wherein
the operating fluid detector has a sealing compound, the sealing compound protecting the light source, the light receiver, the at least one optical deflecting device, and/or the output device.

14. The hand-guided garden, forestry and/or construction machining appliance according to claim 1, wherein
the operating fluid detector is designed in such a way that, with a radiating light source, the light receiver receives rays of light in the case of the presence and in the case of the absence of operating fluid in the operating fluid line, and
the operating fluid detector has an output device, the output device being designed for the output of a fault signal in the case of non-reception.

15. The hand-guided garden, forestry and/or construction machining appliance according to claim 1, wherein
the operating fluid line is straight from a line inlet up to a line outlet of the operating fluid line.

16. The hand-guided garden, forestry and/or construction machining appliance according to claim 1, wherein
the operating fluid detector has a sealing compound, the sealing compound protecting the light source, the light receiver and/or the at least one optical deflecting device.

17. A hand-guided garden, forestry and/or construction machining appliance, comprising:
an operating fluid tank, the operating fluid tank being designed for storage of operating fluid;
an operating fluid pump, the operating fluid pump being designed for delivery of operating fluid from the operating fluid tank; and
an optical operating fluid detector for optical detection of operating fluid for the hand-guided garden, forestry and/or construction machining appliance, the operating fluid detector comprising:
a light source, the light source being designed for radiation of rays of light;
an operating fluid line, the operating fluid line being designed for optical interaction of the rays of light from the light source with operating fluid in the operating fluid line for the optical detection of operating fluid; and
a light receiver, the light receiver being designed for differing reception of rays of light from the operating fluid line in dependence on a presence or absence of operating fluid in the operating fluid line, wherein
the operating fluid line is designed for differing diversion of the rays of light from the light source in dependence on the presence or the absence of operating fluid in the operating fluid line for the optical detection of operating fluid,
an inner surface of the operating fluid line is designed for the differing refraction of the rays of light from the light source in dependence on the presence or the absence of operating fluid in the operating fluid line for the optical detection of operating fluid,
the operating fluid line is aligned in such a way that the rays of light from the light source impinge on the operating fluid line orthogonally in relation to the operating fluid line, wherein the operating fluid line has a round inner form,
the operating fluid line is connected downstream of the operating fluid tank and upstream or downstream of the operating fluid pump,
the garden, forestry and/or construction machining appliance has a machining tool, and
the operating fluid pump is designed for the delivery of operating fluid to the machining tool for lubricating the machining tool with operating fluid in the form of lubricating fluid.

18. A hand-guided garden, forestry and/or construction machining appliance, comprising:
an operating fluid tank, the operating fluid tank being designed for storage of operating fluid;
an operating fluid pump, the operating fluid pump being designed for delivery of operating fluid from the operating fluid tank;
an optical operating fluid detector for optical detection of operating fluid for the hand-guided garden, forestry and/or construction machining appliance, the operating fluid detector comprising:
a light source, the light source being designed for radiation of rays of light;
an operating fluid line, the operating fluid line being designed for optical interaction of the rays of light from the light source with operating fluid in the operating fluid line for the optical detection of operating fluid;
a light receiver, the light receiver being designed for differing reception of rays of light from the operating fluid line in dependence on a presence or absence of operating fluid in the operating fluid line, wherein
the operating fluid line is designed for differing diversion of the rays of light from the light source in dependence on the presence or the absence of operating fluid in the operating fluid line for the optical detection of operating fluid,
an inner surface of the operating fluid line is designed for the differing refraction of the rays of light from the light source in dependence on the presence or the absence of operating fluid in the operating fluid line for the optical detection of operating fluid,
the operating fluid detector is designed in such a way that, with a radiating light source, the light receiver receives rays of light in the case of the presence and in the case of the absence of operating fluid in the operating fluid line,
the operating fluid detector has an output device, the output device being designed for the output of a fault signal in the case of non-reception,
the operating fluid line is aligned in such a way that the rays of light from the light source impinge on the operating fluid line orthogonally in relation to the operating fluid line, wherein the operating fluid line has a round inner form,
the operating fluid line is connected downstream of the operating fluid tank and upstream or downstream of the operating fluid pump,
the garden, forestry and/or construction machining appliance has a machining tool, and
the operating fluid pump is designed for the delivery of operating fluid to the machining tool for lubricating the machining tool with operating fluid in the form of lubricating fluid.

* * * * *